United States Patent
Yasui et al.

(10) Patent No.: US 8,216,692 B2
(45) Date of Patent: Jul. 10, 2012

(54) SLIDE MEMBER

(75) Inventors: Mikihito Yasui, Inuyama (JP); Hideo Tsuji, Inuyama (JP); Hiroyuki Asakura, Inuyama (JP)

(73) Assignee: Daido Metal Company Ltd., Sivhi-Ken (JP)

( * ) Notice: Subject to any disclaimer, the term of this patent is extended or adjusted under 35 U.S.C. 154(b) by 44 days.

(21) Appl. No.: 12/760,713

(22) Filed: Apr. 15, 2010

(65) Prior Publication Data

US 2010/0266869 A1    Oct. 21, 2010

(30) Foreign Application Priority Data

Apr. 15, 2009  (JP) .................. 2009-098955

(51) Int. Cl.
 *F16C 33/12* (2006.01)
 *B32B 15/01* (2006.01)
(52) U.S. Cl. .......... 428/642; 428/673; 384/912
(58) Field of Classification Search .......... None
 See application file for complete search history.

(56) References Cited

U.S. PATENT DOCUMENTS

| 4,978,587 | A   |   | 12/1990 | Mori et al. |   |
|---|---|---|---|---|---|
| 6,863,441 | B2 | * | 3/2005 | Kawachi et al. | 384/276 |
| 7,128,981 | B2 | * | 10/2006 | Kawachi et al. | 428/642 |
| 2008/0102307 | A1 | * | 5/2008 | Zidar | 428/640 |
| 2009/0317654 | A1 | * | 12/2009 | Saruwatari et al. | 428/600 |
| 2010/0248999 | A1 | * | 9/2010 | Izumida et al. | 508/103 |

FOREIGN PATENT DOCUMENTS

| DE | 3917899 A1 | 12/1989 |
|---|---|---|
| JP | 1150296 A | 2/1999 |

OTHER PUBLICATIONS

Office Action by the German Patent Office in German patent application No. 102010014576 on Apr. 11, 2011.

\* cited by examiner

*Primary Examiner* — John J Zimmerman
(74) *Attorney, Agent, or Firm* — Browdy and Neimark, PLLC

(57) ABSTRACT

A slide member including a base material; an intermediate layer consisting of Ag or Ag-based alloy and an additive element of a first quantity formed over the base material; and an overlay comprising Bi or Bi-based alloy and the additive element of a second quantity formed over the intermediate layer, wherein the additive element consists of a low melting point metal, the first quantity being five times or greater than the second quantity.

2 Claims, 6 Drawing Sheets

| Sample No. | | Alloy Layer | Structure of Intermediate Layer (mass%) | | | Structure of Overlay (mass%) | | | |
|---|---|---|---|---|---|---|---|---|---|
| | | | Ag | Sn | In | Bi | Sn | In | Cu |
| Exemplary Experiment | 1 | Cu Alloy | 72 | 28 | – | 94.2 | 5 | – | 0.8 |
| | 2 | Cu Alloy | 73 | 27 | – | 95 | 5 | – | – |
| | 3 | Cu Alloy | 52 | 48 | – | 95 | 5 | – | – |
| | 4 | Cu Alloy | 92 | 8 | – | 98.5 | 1.5 | – | – |
| | 5 | Cu Alloy | 42 | 58 | – | 92.7 | 7.3 | – | – |
| | 6 | Al Alloy | 94 | – | 6 | 99 | – | 1 | – |
| | 7 | Cu Alloy | 82 | – | 18 | 98 | – | 2 | – |
| | 8 | Cu Alloy | 83 | 17 | – | 97 | 2 | 1 | – |
| | 9 | Cu Alloy | 79 | 18 | 3 | 96 | 3 | 1 | – |
| | 10 | Cu Alloy | 84 | 15 | 1 | 96.8 | 3 | 0.2 | – |
| Comparative Experiment | 1 | Cu Alloy | 100 | – | – | 94.2 | 5 | – | 0.8 |
| | 2 | Cu Alloy | 100 | – | – | 95 | 5 | – | – |
| | 3 | Cu Alloy | 91 | 9 | – | 95 | 5 | – | – |
| | 4 | Al Alloy | 100 | – | – | 97 | – | 3 | – |
| | 5 | Cu Alloy | 91 | – | 9 | 98 | – | 2 | – |

FIG. 3A

| SAMPLE NO. | | ALLOY LAYER | MAXIMUM SURFACE PRESSURE WITHOUT CRACK FORMATION (MPa) | |
|---|---|---|---|---|
| | | | BEFORE THERMAL TREATMENT | AFTER THERMAL TREATMENT (150°C×300hr) |
| EXEMPLARY EXPERIMENT | 1 | Cu ALLOY | 100 | 100 |
| | 2 | Cu ALLOY | 95 | 95 |
| | 3 | Cu ALLOY | 90 | 90 |
| | 4 | Cu ALLOY | 100 | 95 |
| | 5 | Cu ALLOY | 85 | 85 |
| | 6 | Al ALLOY | 95 | 95 |
| | 7 | Cu ALLOY | 95 | 95 |
| | 8 | Cu ALLOY | 90 | 90 |
| | 9 | Cu ALLOY | 95 | 95 |
| | 10 | Cu ALLOY | 95 | 95 |
| COMPARATIVE EXPERIMENT | 1 | Cu ALLOY | 100 | 55 |
| | 2 | Cu ALLOY | 90 | 50 |
| | 3 | Cu ALLOY | 95 | 60 |
| | 4 | Al ALLOY | 90 | 55 |
| | 5 | Cu ALLOY | 95 | 55 |

| PLATING LIQUID COMPOSITION | Ag CONCENTRATION | 20~40g/L |
|---|---|---|
| | Sn CONCENTRATION | 0~15g/L |
| | ORGANIC SULFONIC ACID | 30~70g/L |
| | ADDITIVE AGENT GPE-AD | 20ml/L |
| CURRENT DENSITY | | 1.5~3.5A/dm$^2$ |
| TEMPERATURE | | 20~40°C |

FIG. 5

| PLATING LIQUID COMPOSITION | Bi CONCENTRATION | 20~40g/L |
|---|---|---|
| | Sn CONCENTRATION | 0~3g/L |
| | Cu CONCENTRATION | 0~0.8g/L |
| | ORGANIC SULFONIC ACID | 30~70g/L |
| | ADDITIVE AGENT HS-200S | 30~50g/L |
| CURRENT DENSITY | | 3~5A/dm$^2$ |
| TEMPERATURE | | 20~40°C |

| | CONDITIONS |
|---|---|
| TEST MACHINE | DYNAMIC LOAD TEST MACHINE |
| BEARING INNER DIAMETER | 48mm |
| BEARING WIDTH | 18mm |
| ROTATION COUNT | 5600rpm |
| LUBRICANT | VG22 |
| SHAFT MATERIAL | S55C |
| TEST TIME | 10 HOURS |
| METHOD OF EVALUATION | MAXIMUM SURFACE PRESSURE WITHOUT CRACK FORMATION (MPa) |

FIG. 6

SLIDE MEMBER

CROSS-REFERENCE TO RELATED APPLICATIONS

This application is based upon and claims the benefit of priority from the prior Japanese Patent Application No. 2009-098955, filed on, Apr. 15, 2009 the entire contents of which are incorporated herein by reference.

FIELD

The present invention relates to a slide member having an overlay formed on a base material over an intermediate layer. The overlay according one aspect of the present invention is primarily composed of Bi.

BACKGROUND

A slide member such as a slide bearing typically used in internal combustion engines for automobiles, etc. are formed by coating bearing alloy layer comprising Cu-based bearing alloy or Al-based bearing alloy over a back metal layer made of a steel sheet. Slide bearings generally have an overlay coated on the bearing alloy layer over an intermediate layer for improving their conformability with the mating elements, which is typically a shaft. The intermediate layer functions as a bonding layer to facilitate the bonding of the overlay with the bearing alloy layer. Overlays have been conventionally composed of soft Pb-based alloy and in some cases, Sn-based alloy.

Use of Pb is preferably avoided, because of the wide spread notion of Pb as a pollutant. Through research, Bi has been proposed as a possible alternative to Pb. Bi, however, is hard and thus, lacks in conformability. In order to overcome such shortcoming, JP H11-50296 A discloses a Bi-based overlay with one or more additive element(s) selected from Sn and In.

When the overlay is composed of Bi or Bi-based alloy, the intermediate layer is, at times, composed of Ag or Ag-based alloy.

When such configured slide bearings are subjected to high temperature in actual use, the additive elements within the overlay occasionally diffuse into the intermediate layer to disadvantageously reduce the conformability of the overlay.

SUMMARY

In one aspect, the present invention provides a slide member of laminate structure provided with an overlay composed of Bi or Bi-based alloy containing additive elements formed over a base material with an intermediate layer interposed therebetween. The slide member according to the above described structure and the features discussed in more detail hereunder discourages diffusion of the additive elements within the overlay and thus, maintains outstanding conformability with the mating element.

In one aspect of the present invention, there is provided a slide member including a base material; an intermediate layer consisting of Ag or Ag-based alloy and an additive element of a first quantity formed over the base material; and an overlay comprising Bi or Bi-based alloy and the additive element of a second quantity formed over the intermediate layer; wherein the additive element consists of a low melting point metal, the first quantity being five times or more than the second quantity.

FIG. 1 schematically depicts the cross sectional feature of the slide member according to one aspect of the present invention. Slide member 1 shown in FIG. 1 is configured, for instance, by coating base material 2 with overlay 4 over intermediate layer 3.

In the present disclosure, base material 2 is an element which is coated with overlay 4 over intermediate layer 3 and encompasses different set(s) of layers depending on the structure of slide member 1. For instance, in a slide member in which the element corresponding to a back metal layer supports its mating counterpart element without intervention of any other additional layer such as a Cu-based bearing alloy layer and Al-based bearing alloy layer, base material 2 refers to the element corresponding to the back metal layer. If any additional layer is provided over the back metal layer such as the alloy layers described above, base material 2 refers to such additional layer(s), or the additional layer(s) and the back metal layer taken together. FIG. 1 exemplifies the case where base material 2 represents the bearing alloy layer provided over back metal layer 5. Overlay 4 is primarily composed of Bi and Bi-based alloy. Bi-based alloy constituting the primary component of overlay 4 according to the present disclosure does not contain low melting point metal. Intermediate layer 3 is primarily composed of Ag or Ag-based alloy. Intermediate layer 3 in bond with overlay 4 renders overlay 4 less susceptible to delaminating from intermediate layer 3 under high load usage.

Intermediate layer 3 and overlay 4 contain one or more types of additive elements consisting of low melting point metal(s). Despite the possibility of one or more types of additive elements being present in intermediate layer 3 and overlay 4, respectively, "additive element" will be represented in singular or as "additive element (s)" for simplicity. Low melting point metal according to the present disclosure denotes a metal having a melting point lower than the primary component of overlay 4 which is Bi or Bi-based alloy. Overlay 4 containing additive element(s) consisting of low melting point metal lowers its melting point compared to a composition without additive element(s) and is thus, softened to improve conformability of overlay 4. Further, the inventors presumed that by adding additive element(s) identical in type to those added to overlay 4 into intermediate layer 3, diffusion of the additive element(s) within overlay 4 into intermediate layer 3 may be suppressed. Through experiments, it has been verified by the inventors that the additive element (s) become less susceptible to diffusing into intermediate layer 3 from overlay 4 when the quantity of the additive element (s) within intermediate layer 3 is five times or more than the quantity of the additive element(s) within overlay 4. Such quantitative control of additive element(s) prevents variation in composition of overlay 4 over time, thereby maintaining the outstanding conformability of overlay 4 over a long period of time. When adding two or more types of additive elements consisting of low melting point metals, the total quantity of such additive elements within intermediate layer 3 is controlled to be five times or more than the total quantity of such additive elements within overlay 4. When adding two or more types of additive elements, it is further preferable to control the quantity of each type of additive element within intermediate layer 3 to be five times or more than the corresponding quantity of overlay 4. It is still further preferable to control the quantity of additive element(s) within intermediate layer 3 to be seven times or more and twelve times or less than the quantity of additive element(s) within overlay 4.

According to another aspect of the present invention, the additive element consists of at least one of Sn and In.

The melting points of Sn and In are both lower than the melting point of Bi which is the primary component of overlay 4. Thus, by employing at least one of Sn and In as the additive element, the melting point of overlay 4 is lowered, meaning that overlay 4 is softened to improve its conformability.

According to still another aspect of the present invention, the first quantity is 50 mass % or less of a total mass quantity of elements constituting the intermediate layer.

By controlling the quantity of the additive element within intermediate layer 3 to 50 mass % or less, a slide member can be obtained which possesses favorable conformability and fatigue resistance. It is preferable to control the quantity of additive element, within intermediate layer 3, to 5 mass % or more and 35 mass % or less. Such composition provides even greater fatigue resistance and conformability.

BRIEF DESCRIPTION OF THE DRAWINGS

The features and advantages of the present invention will become clear upon reviewing the following description of the exemplary embodiment of the present disclosure with reference to the accompanying drawings, in which.

FIG. 3, parted into FIGS. 3A and 3B but collectively referred to as FIG. 3, is a chart indicating the components of each sample and the outcome of conformability test;

FIG. 4 is a chart indicating the plating conditions applied in forming an intermediate layer;

FIG. 5 is a chart indicating the plating conditions applied in forming an overlay; and FIG. 6 is a chart indicating the plating conditions applied in the conformability test.

DESCRIPTION

Figure 1:
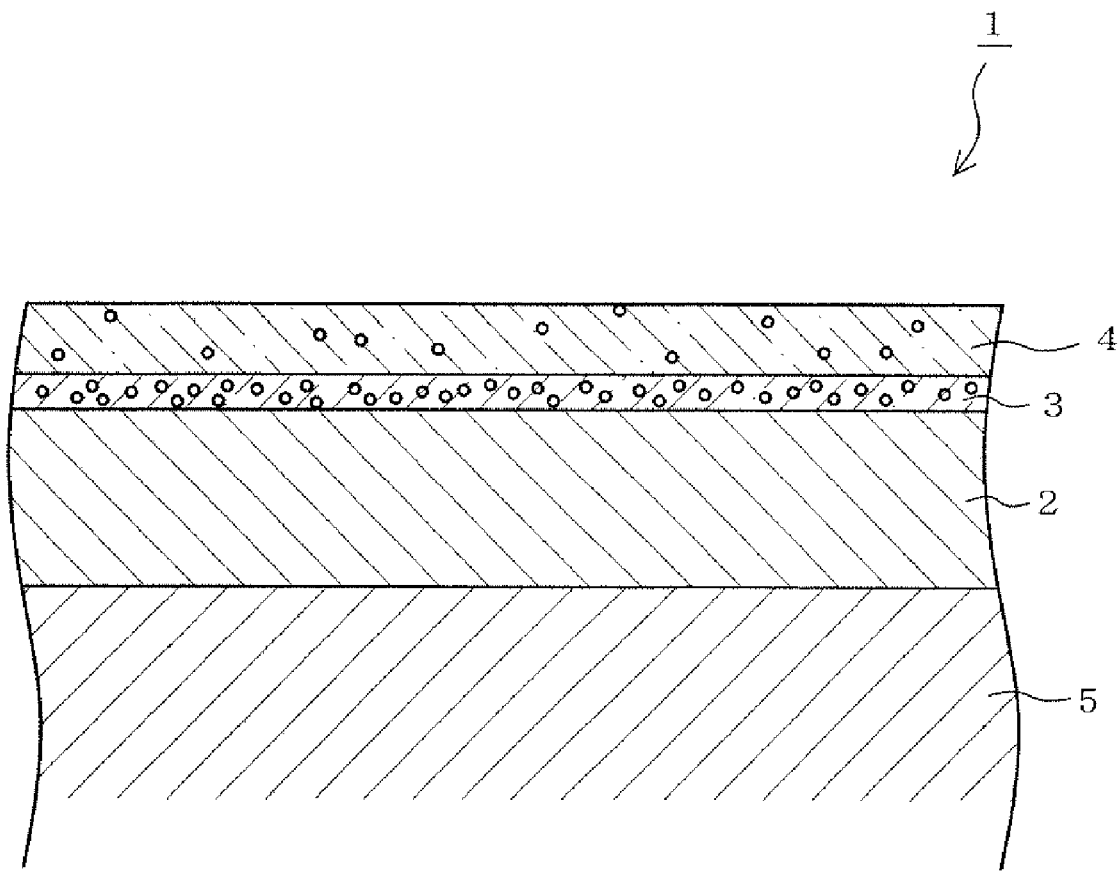
FIG. 1 is a cross sectional view of a slide member according to one aspect of the present invention.

FIG. 1 shows one exemplary embodiment of the present invention including back metal layer 5 made of steel sheet, bearing alloy layer 2 which may also be described as base material 2 made of Cu-based alloy or Al-based alloy formed over back metal layer 5, intermediate layer 3 formed over bearing alloy layer 2, and overlay 4 formed over intermediate layer 3.

Samples were produced that are similar in structure to those of the above described exemplary embodiment having laminated layers of a back metal layer, a bearing alloy layer, an intermediate layer, and an overlay. The samples were categorized into exemplary experiment samples 1 to 10 and comparative experiment samples 1 to 5 which were each produced bases on the conditions indicated in FIG. 3.

The thickness of the intermediate layer and the overlay were measured by the images captured by an electronic microscope. The thickness of the intermediate layer ranged from 3 to 7 µm, whereas the thickness of the overlay ranged from 5 to 15 µm.

The intermediate layer containing Sn was formed on the base material under the plating conditions indicated in FIG. 4, whereas the intermediate layer containing In was formed on the base material under the plating conditions indicated in FIG. 4 to form an Ag-based layer, then plated with In by being immersed in a bath of sulfonic acid, and thereafter thermally treated in the temperature of 100 to 150 degrees Celsius for 60 to 120 minutes as required to diffuse In into the Ag-based layer. GPE-AD indicated in FIG. 4 is a product of Daiwa Fine Chemicals Co., Ltd.

The overlay containing Sn and Cu was formed over the intermediate layer under the plating conditions indicated in FIG. 5. The overlay containing In was formed by forming a Bi-based layer under the plating condition indicated in FIG. 5, then, plated with In by being immersed in a bath of sulfonic acid and thereafter thermally treated in the temperature of 100 to 150 degrees Celsius for 30 to 90 minutes as required to diffuse In into the Bi-based layer. HS-2205 indicated in FIG. 5 is a product of Ebara-Udylite Co., Ltd.

Figure 2:
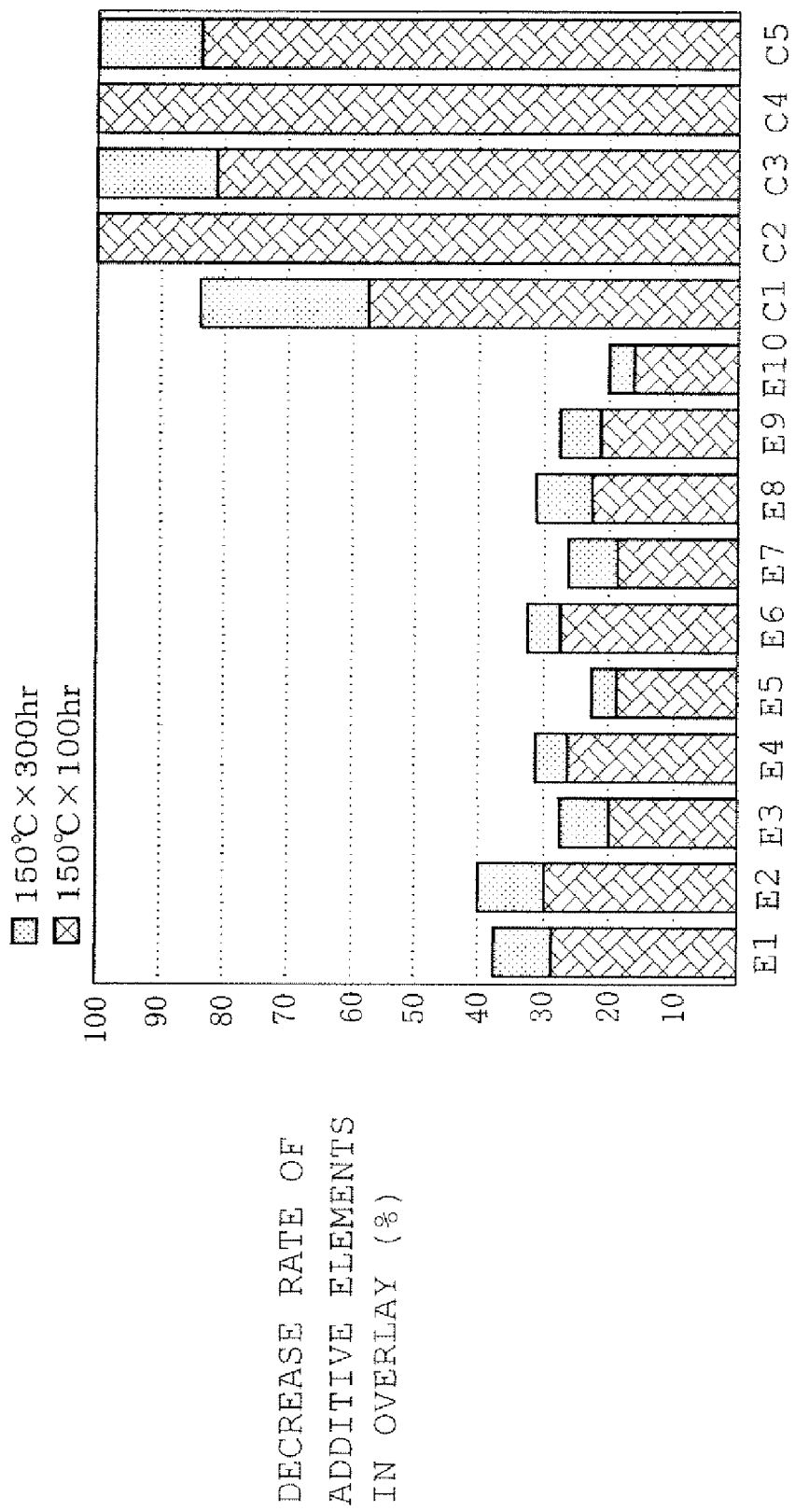
FIG. 2 is a chart indicating the outcome of a diffusion test conducted on the additive elements within the overlay.

Each of the above described samples was tested for the behavior in diffusion of the additive element (s) within the overlay and the test results are indicated in FIG. 2. When heated, the additive element(s) within the overlay generally migrate into the intermediate layer by diffusion and thus, the quantity of additive element(s) within the overlay decreases accordingly. Diffusion test to examine the behavior of additive element(s) within the overlay was conducted under the temperature of 150 degrees Celsius which is close to the actual temperature in which the slide bearing, or more generally, the slide member is used. The quantity of remaining additive element(s) within the overlay was measured after predetermined lapse of time from test start. In the tests carried out for the exemplary and comparative experiment samples, the quantity of additive element(s) within the overlay was measured when the samples were subjected to an ambient of 150 degrees Celsius for two different durations, namely 100 hours and 300 hours.

The quantity of additive element(s) within the overlay was measured by ICP (Inductively Coupled Plasma) analysis after the samples were subjected to the above described temperature for the predetermined duration of 100 hours and 300 hours and after further being dissolved in acid.

The horizontal axis of FIG. 2 is marked with sample numbers. Of note is that "exemplary experiment" is abbreviated as "E" whereas "comparative experiment" is abbreviated as "C". As labeled, the vertical axis of FIG. 2 indicates "decrease rate of additive elements in overlay" from test start. This means that the rate of decrease in the quantity of additive elements within the overlay from test start can be obtained by {(mass concentration of additive element within overlay before test start)−(mass concentration of additive element remaining in overlay after lapse of predetermined time)}× 100÷(mass concentration of additive element within overlay before test start). Mass concentration is given in mass % and the predetermined time is assigned either 100 hours or 300 hours as described earlier. It can be appreciated from the chart plotting the solution of the equation that the additive element(s) within the overlay becomes less susceptible to diffusing into the intermediate layer as "decrease rate of additive element in overlay" from test start proximates 0%.

Further, the above described samples were tested for their conformability based on the conditions indicated in FIG. 6. The test results are presented in FIG. 3. The values given under "BEFORE THERMAL TREATMENT" indicate the evaluation of conformability without thermally treating the produced samples, whereas the values given under "AFTER THERMAL TREATMENT" indicate the evaluation of conformability after the produced samples were subjected to an ambient of 150 degrees Celsius for 300 hours.

Next, an analysis will be given of the results of the above described tests.

Results of diffusion test show that the rate of decrease in additive element(s) within the overlay is less in exemplary experiments 1 to 10 as compared to comparative experiments 1 to 5. Based on the comparison between exemplary experiments 1 to 10 with comparative experiments 1 to 5, it can be appreciated that diffusion of additive element(s) within the overlay is suppressed when the quantity of additive element(s) within the intermediate layer is five times or more than the quantity of additive element(s) within the overlay.

Results of conformability test show that the maximum surface pressure the sample is tolerable without crack formation after 300 hours of thermal treatment is advantageous in exemplary experiments 1 to 10 compared to comparative experiments 1 to 5, meaning that exemplary experiments 1 to 10 have more favorable conformability as compared to comparative experiments 1 to 5. Based on the comparison between exemplary experiments 1 to 10 with comparative experiments 1 to 5, and especially from comparison between exemplary experiments 6 and 7 with comparative experiment 5, it can be appreciated that diffusion of additive element(s) within the overlay can be significantly suppressed when the quantity of additive element(s) within the intermediate layer is five times or more than the quantity of additive element(s) within the overlay, and thus, maintaining the conformability of the overlay at an outstanding level for a long period of time.

Further, exemplary experiment samples containing 50 mass % or less amount of additive element(s) within the intermediate layer showed exceptionally advantageous fatigue resistance while maintaining the conformability at a favorable level.

The present invention may be applied to slide members used in wide range of fields and is not limited to application to slide bearings for automobiles.

The foregoing description and drawings are merely illustrative of the principles of the present invention and are not to be construed in a limited sense. Various changes and modifications will become apparent to those of ordinary skill in the art. All such changes and modifications are seen to fall within the scope of the invention as defined by the appended claims.

What is claimed is:

1. A slide member comprising:
    a base material;
    an intermediate layer consisting of Ag or Ag-based alloy and an additive element of a first quantity formed over the base material; and
    an overlay comprising Bi or Bi-based alloy and the additive element of a second quantity formed over the intermediate layer;
    wherein the additive element consists of a low melting point metal, the first quantity being five times or greater than the second quantity, and
    wherein the additive element consists of at least one of Sn and In.

2. The slide member according to claim 1, wherein the first quantity is 50 mass % or less of a total mass quantity of elements constituting the intermediate layer.

* * * * *